US011948379B2

(12) United States Patent
Bruss et al.

(10) Patent No.: US 11,948,379 B2
(45) Date of Patent: *Apr. 2, 2024

(54) SYSTEMS AND METHODS OF DETECTING EMAIL-BASED ATTACKS THROUGH MACHINE LEARNING

(71) Applicant: Capital One Services, LLC, McLean, VA (US)

(72) Inventors: Christopher Bayan Bruss, Washington, DC (US); Stephen Fletcher, Arlington, VA (US); Lei Yu, McLean, VA (US); Jakob Kressel, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 684 days.

This patent is subject to a terminal disclaimer.

(21) Appl. No.: 17/068,554

(22) Filed: Oct. 12, 2020

(65) Prior Publication Data

US 2021/0112095 A1    Apr. 15, 2021

Related U.S. Application Data

(63) Continuation of application No. 16/507,743, filed on Jul. 10, 2019, now Pat. No. 10,805,347, which is a
(Continued)

(51) Int. Cl.
*H04L 29/06* (2006.01)
*G06F 18/214* (2023.01)
*G06F 18/241* (2023.01)
*G06N 20/00* (2019.01)
*G06V 30/19* (2022.01)
*H04L 9/40* (2022.01)
(Continued)

(52) U.S. Cl.
CPC ...... *G06V 30/19173* (2022.01); *G06F 18/214* (2023.01); *G06F 18/241* (2023.01); *G06N 20/00* (2019.01); *H04L 51/08* (2013.01); *H04L 51/212* (2022.05); *H04L 63/1416* (2013.01); *H04L 63/1425* (2013.01); *H04L 63/1483* (2013.01)

(58) Field of Classification Search
None
See application file for complete search history.

(56) References Cited

U.S. PATENT DOCUMENTS 8,903,920 B1    12/2014  Hodgson
9,686,308 B1    6/2017   Srivastava
(Continued)

*Primary Examiner* — William J. Goodchild
(74) *Attorney, Agent, or Firm* — TROUTMAN PEPPER HAMILTON SANDERS LLP; Christopher J. Forstner; John A. Morrissett

(57) ABSTRACT

A system including at least one processor; and at least one memory having stored thereon computer program code that, when executed by the at least one processor, controls the at least one processor to: receive an email addressed to a user; separate the email into a plurality of email components; analyze, using respective machine-learning techniques, each of the plurality of email components; feed the analysis of each of the plurality of email components into a stacked ensemble analyzer; and based on an output of the stacked ensemble analyzer, determine whether the email is malicious.

20 Claims, 4 Drawing Sheets

Related U.S. Application Data continuation of application No. 16/168,055, filed on Oct. 23, 2018, now Pat. No. 10,397,272.

(60) Provisional application No. 62/669,660, filed on May 10, 2018.

(51) Int. Cl.
*H04L 51/08* (2022.01)
*H04L 51/212* (2022.01)

(56) References Cited

U.S. PATENT DOCUMENTS

| | | | |
|---|---|---|---|
| 10,482,239 B1* | 11/2019 | Liu | G06F 21/563 |
| 2004/0030913 A1* | 2/2004 | Liang | G06F 21/566 |
| | | | 726/22 |
| 2007/0277238 A1 | 11/2007 | Margalit et al. | |
| 2008/0187140 A1 | 8/2008 | McGillian et al. | |
| 2009/0190479 A1 | 7/2009 | Parsons | |
| 2010/0198924 A1 | 8/2010 | Collet et al. | |
| 2012/0297000 A1 | 11/2012 | DellaFera et al. | |
| 2013/0103682 A1 | 4/2013 | Ghosh et al. | |
| 2016/0098779 A1 | 4/2016 | Wilezek et al. | |
| 2016/0110238 A1 | 4/2016 | Burugula et al. | |
| 2016/0287166 A1 | 10/2016 | Tran | |
| 2016/0344770 A1* | 11/2016 | Verma | H04L 51/42 |
| 2017/0078234 A1 | 3/2017 | Massand | |
| 2017/0177727 A1 | 6/2017 | Scoda et al. | |
| 2017/0185800 A1 | 6/2017 | Bentley et al. | |
| 2018/0270215 A1 | 9/2018 | Padmanabhan et al. | |
| 2018/0359280 A1 | 12/2018 | Elworthy | |
| 2019/0260780 A1 | 8/2019 | Dunn et al. | |

* cited by examiner

SYSTEMS AND METHODS OF DETECTING EMAIL-BASED ATTACKS THROUGH MACHINE LEARNING

CROSS-REFERENCE TO RELATED APPLICATIONS

This application is a continuation of, and claims priority under 35 U.S.C. § 120 to, U.S. patent application Ser. No. 16/507,743, filed Jul. 10, 2019, which is a continuation of U.S. patent application Ser. No. 16/168,055, filed Oct. 23, 2018, which claims the benefit of U.S. Provisional Application No. 62/669,660, which was filed on May 10, 2018, the entire contents and substance of each of which are hereby incorporated by reference in their entirety as if fully set forth herein.

FIELD

The present invention generally relates to the field of cyber security, and, more specifically, to improved machine-learning systems and methods to detect email-based attacks.

BACKGROUND

Email-based attacks present significant risks for enterprises and individuals. For example, phishing attacks generally refers to an effort to acquire sensitive information from unsuspecting victims. Email-based phishing-schemes represent up to one-out of every 4,500 emails. Research groups routinely identify tens of millions of phishing attacks every month. Often, these efforts are conducted by attackers posing as legitimate and trustworthy entities.

In the related art, various types of detection mechanisms have been developed. However, these systems fail to automatically recognize many phishing schemes, and incorrectly flag numerous valid (i.e., non-phishing) emails as phishing attacks. Successful phishing campaigns are typically successful within hours of launching. However, detection by related art public or proprietary systems may not be updated to detect new campaigns for up to several weeks. Thus, individuals and organizations continue to be exposed to email-based attacks, and must expend valuable resources (e.g., time, man-power, and computing power), organizing and assessing incorrectly flagged emails.

For example, in related art systems, filters and other tools used to screen incoming e-mails for an enterprise may fail to block all malicious emails to employees of the enterprise. Enterprises may train employees to help identify malicious e-mails that get through the filters and may provide a mechanism to report the same to technology security. However, employees regularly fail to accurately and consistently identify all malicious emails and/or fail to report some they correctly identify. Additionally, a significant percentage of reported emails (i.e., emails identified by employees as malicious) are often false-positives (e.g., legitimate emails, even if undesired by the reporter). In some enterprises, analysts may manually review each reported email, which is time consuming, error prone, and often requires review of redundant (copied) emails. This process may take days or weeks from the time of reporting to identify malicious emails.

Accordingly, there is a need for improved systems and methods to provide more efficient and effective email-attack detection. Embodiments of the present disclosure are directed to this and other considerations.

SUMMARY

The present disclosure relates to systems and methods of detecting email-based attacks through machine learning, and enhancements thereto. According to some embodiments, there is provided a system including: at least one processor; and at least one memory having stored thereon computer program code that, when executed by the at least one processor, controls the at least one processor to: receive an email addressed to a user; separate the email into a plurality of email components; analyze, using respective machine-learning techniques, each of the plurality of email components; feed the analysis of each of the plurality of email components into a stacked ensemble analyzer; and based on an output of the stacked ensemble analyzer, determine whether the email is suspicious.

The stacked ensemble analyzer may include a nonparametric model.

The plurality of components may include at least one from among an email header, an email body, a subject line, one or more links, and one or more attachments.

The computer program code, when executed by the at least one processor, may control the at least one processor to analyze at least one of the email body and the subject line using term frequency-inverse document frequency (TF-IDF) logistic regression trained with an email corpus.

The computer program code, when executed by the at least one processor, may control the at least one processor to analyze the subject line to determine an implied urgency of the subject line.

The computer program code, when executed by the at least one processor, may control the at least one processor to analyze the header data using a random decision forest classifier.

The computer program code, when executed by the at least one processor, may control s the at least one processor to analyze the one or more links by, for each of the one or more links: virtually navigating to an end-point of the link; tracking link re-routing; in response to an automatic download being triggered by the navigating triggering an automatic download, isolating and analyzing the automatic download; and analyzing content of a final link destination.

The computer program code, when executed by the at least one processor, may control the at least one processor to compare a universal resource locator (URL) of the at least one links with a domain of a sender of the email.

The computer program code, when executed by the at least one processor, may control the at least one processor to analyze the email header by analyzing a path of delivery of the email.

The stacked ensemble analyzer may include at least one of random-forest classifier and a gradient boosting machine.

The computer program code, when executed by the at least one processor, may further control the at least one processor to: output, to a systems operations console, the email; receive, from the systems operations console, an external indication as to whether the email is malicious; and based on a comparison of the external indication and the determination, update the stacked ensemble analyzer with the email analysis.

The computer program code, when executed by the at least one processor, may further control the at least one processor to update, based on the comparison of the external indication and the determination, at least one of the respective machine-learning techniques.

The computer program code, when executed by the at least one processor, may control the at least one processor to update at least one of the respective machine-learning techniques by: updating training corpus of the at least one of the machine-learning techniques based on the email; and incrementally adapt the at least one of the machine leaning techniques based on the updated training corpus.

The computer program code, when executed by the at least one processor, may further control the at least one processor to, in response to determining that the email is suspicious, generate a sanitized version of the email, and replace, within a user account of the user, a copy of the email with the generated sanitized version of the email.

The computer program code, when executed by the at least one processor, may further control the at least one processor to, in response to determining that the email is suspicious, isolate the email form a user account of the user.

According to some embodiments, there is provided a system including: an email server; at least one reception device; an attack-detection server, wherein the email server is configured to: receive a plurality of emails directed to a user of the at least one reception device; and deliver the plurality of emails to the at least one reception device and the attack-detection server, and wherein the attack-detection server is configured to: analyze, using at least one machine-learning techniques, the plurality of emails to identify suspicious emails within the plurality of emails; and in response to identifying one or more suspicious emails, alert the at least one reception device of the suspicious emails.

The attack-detection server may be further configured to: deliver a subset of the plurality of emails to the analyst device; receive, from the analyst device, an indication of maliciousness of each of the subset of emails; and update, based on comparing the indication to corresponding analysis by the attack-detection server of each of the subset of emails, at least one of the machine-learning techniques.

The least one reception device may be configured to: receive user input indicating an email from within the plurality of emails as suspicious; and transmit, to the attack-detection server, an identification of the indicated email. The attack-detection server may be configured to: analyze the identified email; and transmit, to the at least one reception device, a result of the analysis of the identified email.

The email server may include a message transfer agent (MTA) filter and the email server filters out a portion of the plurality of emails before delivering the plurality of emails to the at least one reception device and the attack-detection server.

According to some embodiments, there is provided a system as including: at least one processor; and at least one memory having stored thereon computer program code that, when executed by the at least one processor, controls the at least one processor to: receive an email addressed to a user; separate the email into a plurality of email components, the plurality of components comprising an email header, an email body, a subject line, and one or more links; perform, on raw text of the email body and the subject-line, text-embedding to vectorize the raw text into a lower-dimensional space; generate, from the email header and the one or more links, a plurality of meta-features associated with the email; feed the text-embedded text and the plurality of meta-features into a neural network classifier; and based on an output of the neural network classify, determine whether the email is suspicious.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In some cases, implementations of the disclosed technology include a system configured to utilize machine-learning algorithms to identify potentially malicious e-mails related art systems cleared. In some embodiments, a second level email defense system utilizes machine-learning, and may leverage the large number of emails and employee interactions to encourage active defense and improve detection. The example techniques may also provide a first line of defense for emails entering a network or enterprise.

Figure 1A:
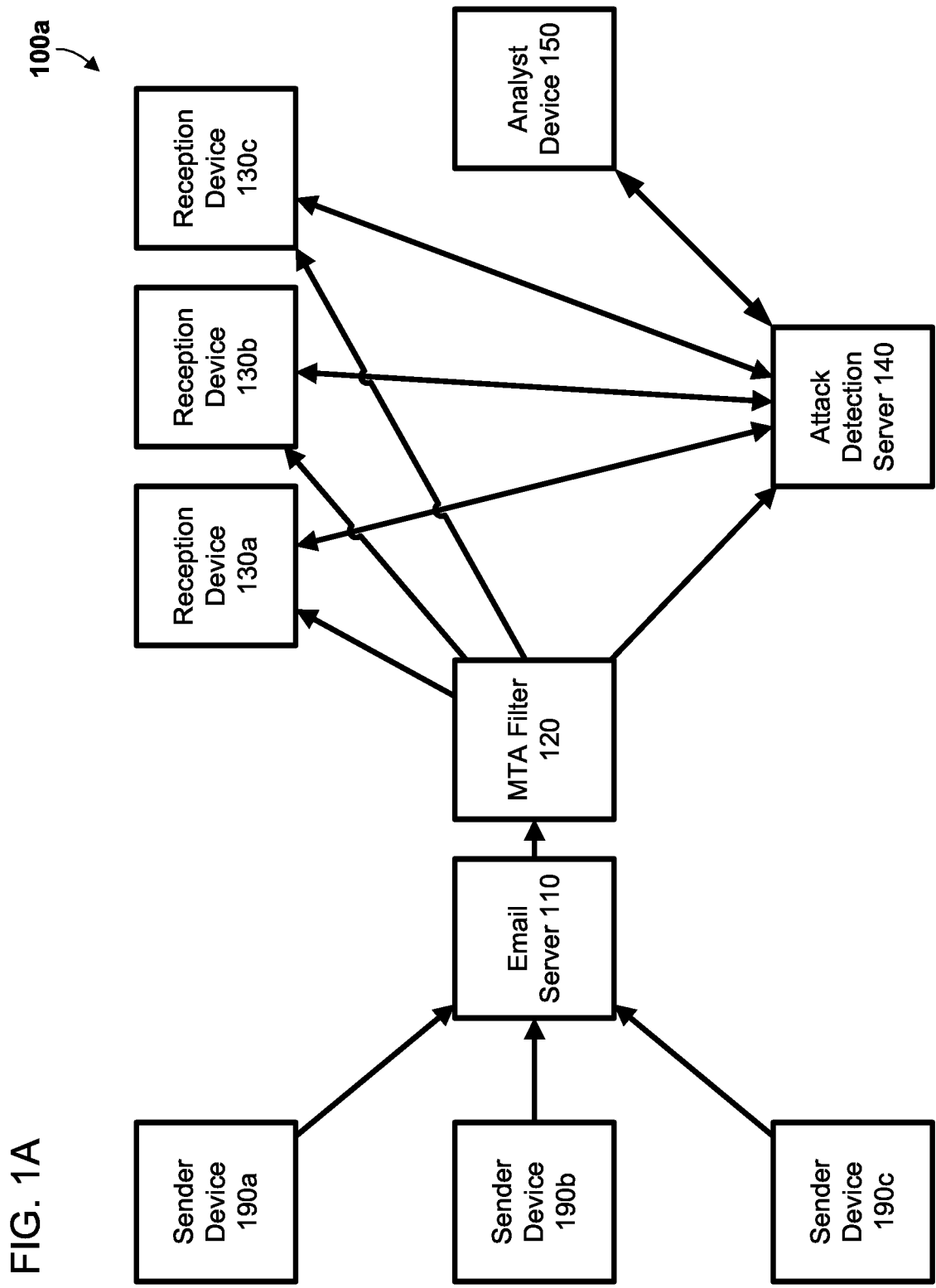
FIGS. 1A and 1B are example block diagrams representing system environments that may implement one or more aspects of the present disclosure.

Turning to FIG. 1A, FIG. 1A illustrates a system environment 100a in which one or more aspects of the present disclosure may be implemented. System environment 100a includes email server 110, message transfer agent (MTA) filter 120, reception devices 130a-130c, attack-detection server 140, analyst device 150, and sender devices 190a-190c. A non-limiting example of a computer system architecture that can implement one or more of email server 110, MTA filter 120, reception devices 130a-130c, attack-detection server 140, analyst device 150, and sender devices 190a-190c will be described below in greater detail with reference to FIG. 3.

Sender devices 190a-190c transmit emails to an enterprise or organization (e.g., to addresses associated with the organization or its employees). For example, email server 110 may receive emails from one or more email sender devices 190a-190c. MTA filter 120 may filter out certain identified malicious emails (e.g., phishing emails), and forward the remainder emails to appropriate reception devices 130a-130c. For example, MTA filter 120 may forward the remaining emails to one or more of reception device 130a, 130b, and 130c based on user profiles of the respective device. Moreover, in some embodiments, MTA filter 120 may transmit the remaining emails to attack-detection server 140. In some cases, attack-detection server 140 may analyze all emails sent from MTA filter 120. In some implementations MTA filter 120 may transmit all emails to attack-detection server 140, and tag malicious emails (i.e., emails the MTA filter 120 has identified as malicious) for refinement of attack-detection server 140 and/or for a secondary check on maliciousness.

Users of reception devices 130a-130c may identify certain emails received from MTA filter 120 as potential malicious, and control reception devices 130a-130c to flag the identified emails as malicious. For example, reception devices 130a-130c may forward identified emails to attack-detection server 140. In some implementations, an email client on the reception devices 130a-130c may include a single-input action to report potentially malicious emails to attack-detection server 140.

Attack-detection server 140 analyzes the forwarded emails and provides immediate feedback to the reception devices 130a-130c. For example, if attack-detection server 140 determines that the forwarded email is legitimate or malicious, attack-detection server 140 may indicate the same to reception devices 130a-130c. In some cases, attack-detection server 140 may not be able to determine whether the forwarded email is malicious, attack-detection server 140 may then send the same to analyst device 150. An analyst may access the analyst device 150 and determine whether the emails are malicious. The determination may be sent back to attack-detection server 140, which may then refine its analysis models. In some cases, an analyst using analyst device 150 may review some determinations by the attack-detection server 140 to identify false positives (flagged legitimate emails) and false negatives (e.g., allowed malicious emails). This review may be fed back to attack-detection server 140 to refine or retrain the machine-learning algorithms. In this way, the training data set may be increased iteratively, as well as improving the model analysis over time. As the attack-detection server 140 may determine the status of a substantial number of potentially malicious emails (i.e., whether the email is legitimate or malicious), resources (e.g., analysts time and consideration) may be dedicated to the truly pernicious attacks. Moreover, by iteratively refining or retraining the machine learning algorithms, attack-detection server 140 may quickly adapt to identify new malicious emails (e.g., new types of malicious emails or new approaches of malicious emails), which limits the risk of the machine learning algorithms becoming ineffective. Thus, in some embodiments, system environment 100a may provide a closed-loop feedback system to enable swift identification of malicious emails, as well as continued improvement and adaptation for identifying malicious emails.

In some embodiments, a training corpus of attack-detection server 140 (e.g., a training corpus of one or more machine-learning techniques used by the attack-detection server 140) may be updated to include the review of analyst device 150. Attack-detection server 140 may incrementally update utilized machine-learning techniques based on the review to improve model analysis. For example, when the attack-detection server 140 identifies any high-risk email (e.g., high-priority alert on the email), the email may be forwarded to a security operations center (SOC) analyst for further review. In some cases, the attack-detection server 140 may also send a subset (e.g., random or pseudo-random selection of emails, one out of every X emails, or a certain number of emails a day) that are determined to be other than high-priority (i.e., emails determined to be benign (low-priority) or emails with limited risk (medium-priority)). When an analyst completes the review, they may mark the email as either malicious or benign. The system logs the result (i.e., whether the SOC analyst agreed with the designation) as a performance metric for the machine-learning model/version. Over time this accuracy tracking may be used to automatically trigger model refitting and the analyst annotation can be used to increase the size (or potential size) of the training data. Accordingly, as methods of attack change since the model was originally fit, the model can be dynamically updated accordingly. One of ordinary skill will recognize that the analysis of both high priority and low priority emails (and in some cases, medium-priority emails) allows the system to preemptively identify problems with false positives (i.e., benign emails marked malicious) and false negatives (malicious emails marked benign).

In some implementations, the SOC analyst may add tags to reviewed emails in addition to 'benign' or 'malicious.' Once a critical mass of emails is provided with a particular tag, the classifier can automatically assess emails (future and past) in accordance with the additional tag (e.g., after retraining with the additionally tagged emails included in the training set). One of ordinary skill will recognize, in light of the present disclosure, that the critical mass of emails may, in some cases, be a predetermined number, while, in other cases, may be context specific (e.g., based on a nuance associated with the tag). Before the critical mass of emails are provided, the system may offer a preliminary assessment regarding the tags. Accordingly, in some cases, the system may organically learn customized ontologies over time as different needs and/or issues arise. As a non-limiting example, added tags may include a specific type of maliciousness, such as spearphishing, advanced persistent threat (APT), Business Email Compromise, and Executive Spoof.

In some embodiments, attack-detection server 140 may rank potentially malicious emails by priority, and send the ranking (or data representative thereof) to the analyst device 150. As non-limiting examples, the ranking may be based on one or more of likelihood of maliciousness, sophistication of attack (e.g., how legitimate a potential email appears), breadth of attack (e.g., if numerous employees received the same email), and potential impact (e.g., expected harm from succumbing to the attack). This way, higher priority emails (e.g. potentially malicious emails) may be identified and prioritized for investigation thus limiting delay in detecting potential attacks.

In some implementations, attack-detection server 140 may analyze all emails received from MTA filter 120 automatically. If attack-detection server 140 detects any false positives (e.g., legitimate emails that were tagged as malicious), attack-detection server 140 may forward the same to the appropriate reception device 130a-130c. If attack-detection server 140 identifies an email delivered to a reception device 130a-130c as malicious, it may notify the appropriate respective reception device 130a-130c. In some cases, attack-detection server 140 may initiate a quarantine of the malicious email delivered to the reception device 130a-130c, or place certain access restrictions on the identified email. In some cases, analysis of all e-mails received by an organization may reveal additional malicious emails. For example, if an identical or substantially identical email is sent to dozens or hundreds of employees, this may be an indication that mass spam has been sent out. However, if all hyperlinks titled "Sign-In to Your Account" have the same URL, this may indicate that the mass emails are part of a phishing attack.

Attack-detection server 140 may utilize various machine-learning structures to identify malicious emails. For example, in some embodiments, attack-detection server 140 may utilize supervised learning from historical, labeled emails. The inventors found a surprising benefit in segmenting email data and utilizing different models for different types of data. For example, by segmenting the data, specialized models may be tailored to the specific data segment, while any biases and noise can be averaged out by combining the different models.

In some cases, after attack-detection server 140 determines an email is malicious, attack-detection server 140 may isolate the malicious email from a user account. For example, attack-detection server 140 may delete the malicious email from the user account and clean traces of the email from the user account. In some embodiments, attack-detection server 140 may generate a sanitized version of the malicious email and exchange the malicious email with the sanitized version in the user account. The sanitized version may include a visual representation of the malicious email, with all active elements removed (e.g., removing all links and attachments, and changing a reply address). In some cases, the sanitized version may include a warning to the user that the sanitized version corresponds to a malicious email. In some cases, when the malicious email is identified prior to delivering the email to the user, the sanitized version may be generated and delivered to the user instead of the malicious email.

In some instances, when a malicious email is identified, the system may analyze corporate network logs to determine whether a URL in the email has been clicked, what actions resulted (e.g., was any file downloaded), who clicked the URL, and when/how often/how many times the URL was selected. In some cases, the system may determine whether additional users within the enterprise received similar emails to the identified malicious email and, if so, may proactively quarantine or clean the similar emails. In some instances, when a malicious email is detected, the system may generate and update network rules (e.g., firewalls or email filters) to block emails and/or communication to/from specific IP addresses. In some cases, the system may be able to correlate specific malicious emails attacks with past attacks and/or external threat feeds to determine, for example, attack patterns.

One of ordinary skill will recognize that, in some embodiments, various features and functions of one or more of email server 110, MTA filter 120, attack-detection server 140, and analyst device 150, may be implemented in one or more respective physical or logical devices. Similarly, in some implementations, various features and functions of one or more of email server 110, MTA filter 120, attack-detection server 140, and analyst device 150, may be jointly-implemented in one or more physical or logical devices.

Figure 1B:
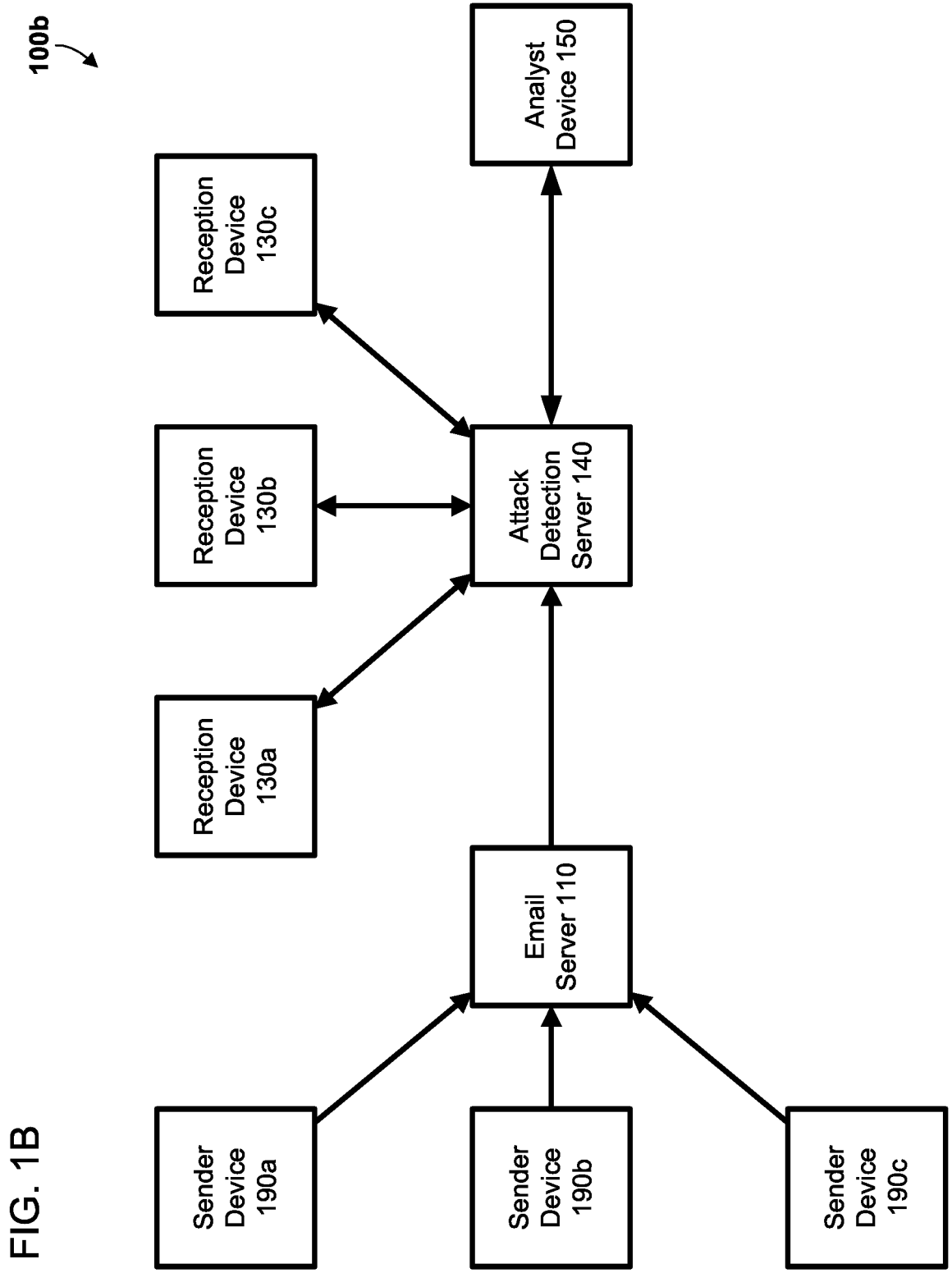

FIG. 1B illustrates a system environment 100b in which one or more aspects of the present disclosure may be implemented. System environment 100b includes email server 110, reception devices 130a-130c, attack-detection server 140, analyst device 150, and sender devices 190a-190c. The functions and elements of email server 110, reception devices 130a-130c, attack-detection server 140, analyst device 150, and sender devices 190a-190c may be substantially similar to those described with reference to FIG. 1A. However, as compared to system environment 100a, system environment 100b does not include a separate MTA filter 120. Accordingly, email server 110 may receive emails from one or more email sender devices 190a-190c, and attack-detection server 140 may filter out certain malicious emails (e.g., phishing emails), and forward the remainder emails to appropriate reception devices 130a-130c. However, this is merely an example and, in some cases, one or more aspects of attack-detection server 140 may be utilized in an MTA filter. For example, attack-detection server 140 may provide a first-line defense (e.g., gateway screening or filtering) to an enterprise email system.

Users of reception devices 130a-130c may identify certain emails received from attack-detection server 140 as potentially malicious, and control reception devices 130a-130c to flag the identified emails as potentially malicious. Attack-detection server 140 may then re-analyze the forwarded emails and provide immediate (e.g., near real-time) feedback to the reception devices 130a-130c and/or send the forwarded emails to analyst device 150, for example, similar to that described above.

Figure 2A:
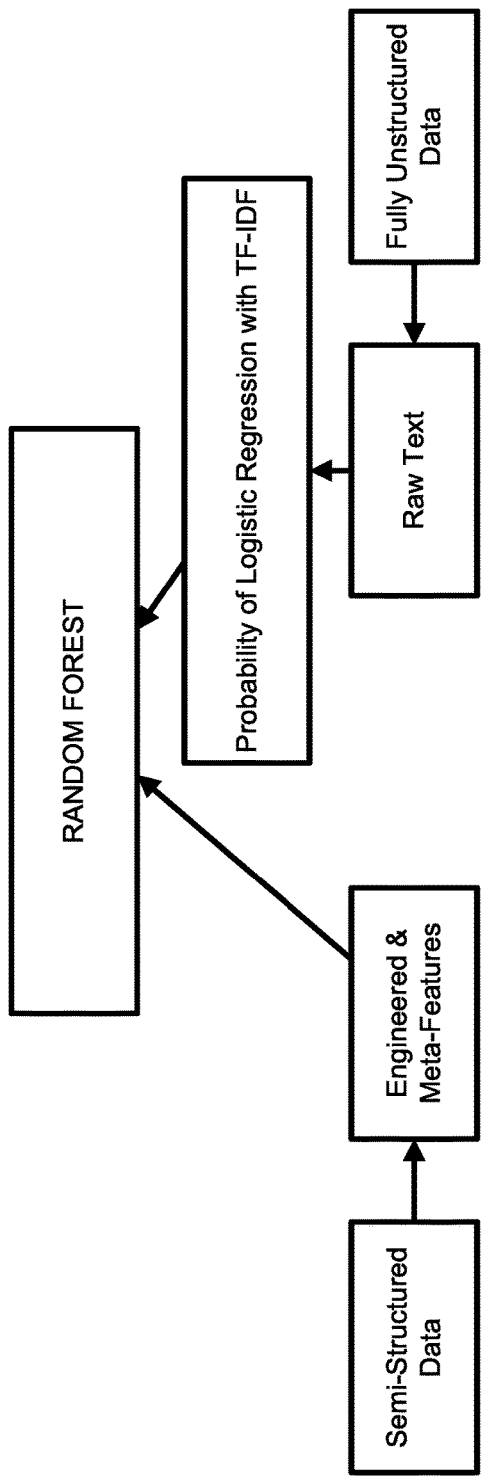
FIGS. 2A and 2B illustrate machine-learning structures for malicious email detection according to certain example implementations.

FIG. 2A illustrates an example machine-learning structure that may be implemented by the attack-detection server 140 in some implementations. In FIG. 2A, in some implementations, unstructured email subject-line data and/or body text (e.g., fully unstructured data) may be analyzed using term frequency—inverse document frequency (TF-IDF) logistic regression. Semi-structured, header data (e.g., semi-structured data) may be analyzed using a random decision forest classifier. Header data may include, as non-limiting examples, sender address, sender domain, IP addresses, time sent, and recovered listing (e.g., list of servers and computers through which the message was routed; path of delivery). In certain instances, different fields included in the header may be indicative of benign or malicious communications. For instance, the inclusion of an "unsubscribe" within the header may indicate that the corresponding email is benign, even if it corresponds to mass-marketing material. In some cases, the random decision forest classifier may also receive, as input, output from the TF-IDF logistic regression. The output from the TF-IDF logistic regression may include a metric indicative of a probability that the email is malicious or benign. The TF-IDF matrices of the subject line and body may be submitted to separate logistic regression classifiers. In some cases, long short-term memory recurrent neural networks may be used to analyze one or more of an emails subject line and body. In some instances, computational neural nets may be utilized as a text classifier for one or more of the email subject line and body.

A separate machine-learning analysis may be performed on any URLs or embedded links identified in the email. In some cases, the attack-detection server 140 (e.g., acting alone or in conjunction with one or more other devices within the system 100a/100b) may receive the email, parse the email into portions (e.g., header, subject line, body text, URLs or other embedded links, etc.), and organize the email portions to be analyzed using the machine-learning models. In some cases, features derived from one or more of URL analysis, header analysis, and attachment analysis may be fed into a nonparametric model (e.g., a random-forest classifier or gradient boosting machine). For example, the distribution of features derived from URL analysis, header analysis and attachment analysis may not normal, so the use of a nonparametric model compensates for this difference. A stacked ensemble classifier may take, as inputs, the results of a plurality of additional lower-level classifiers to determine whether an email is malicious. Stacked ensemble modeling enables averaging out noise and/or biases from diverse models, thereby enhancing the model accuracy. By utilizing a collection of diverse classifiers (e.g., classifiers that focus on different data and types of data), certain improvements may be realized over the related art.

According to some embodiments, raw text (e.g., subject line and body text) may be provided into a text-embedding space, which is then embedded into a lower dimensional (e.g., but richer) space. For example, this embedding may utilize word-to-vector (e.g., Word2Vec) algorithms to encode a word or group of words within the raw text with their expected context. The embedded text may then be fed into a neural network classifier along with meta-features (e.g., features derived from URL analysis, header analysis and attachment analysis) at the same time. In some cases, this allows the neural-network classifier to learn and minimize an error around a combination of different words and features.

In some implementations, the word embeddings may be derived specifically to wording in emails. In the related art, word-embeddings are trained on large word corpuses. Accordingly, certain improvements to malicious email detection may be derived from generating word embeddings based on emails, which may provide statistical representations of each word according to where they tend to occur in emails. Thus, the presence (or absence) of particular words in particular portions of emails may be utilized to more accurately identify malicious emails. In some cases, pre-processing of email training data may be performed to remove portions of emails from the training (e.g., image embeddings).

In some implementations, images within an email may be analyzed. For example, an image (e.g., a logo) may be analyzed to determine if it corresponds to a known vendor. If so, links included in the email may be analyzed to determine whether the IP addresses of the links correspond to the known vendor. For instance, a U.S. based company would not typically utilize links with a ".ru" domain. Similarly, a sender's top-level domain may be indicative of malicious emails. For instance, consumer branches of financial institutions would not generally receive emails from a ".edu" address.

Figure 2B:
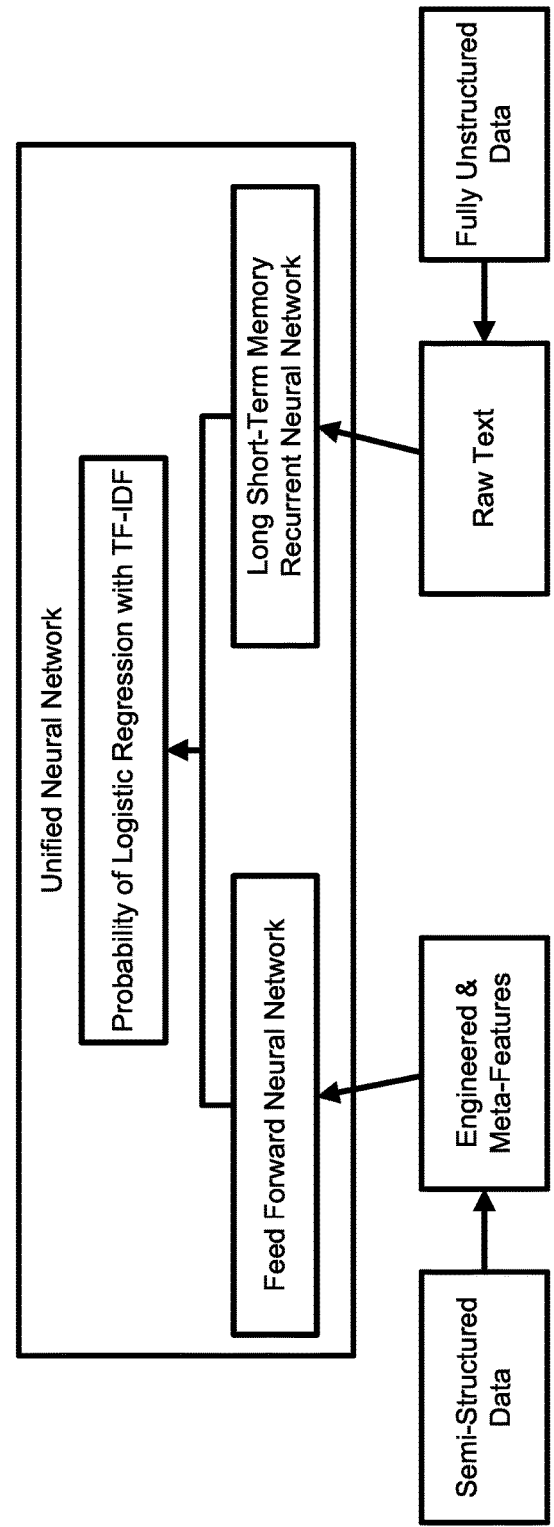

FIG. 2B illustrates another example machine-learning structure that may be implemented by the attack-detection server 140 in some implementations. In FIG. 2B, both engineered and meta attributes (e.g., headers/header derived or other semi-structured data such as answers to: "do the sender's email address and name match," "does the email address domain recur in the body of the email," "what day of the week was the email sent?") and raw text (e.g., email subject-line, email body, or other unstructured email data) may all be fed into a single unified neural network (UNN). Within the UNN, the engineered and meta files may first be fed into a feed forward neural network (FFNN). Meanwhile, the raw text data may initially be fed into a recurrent neural network (RNN), such as long short-term memory recurrent neural network (LSTM RNN). Outputs from the FFNN and LSTM RNN are then fed into a fully-connected dense layer, which outputs a determination as to whether the email is likely malicious (e.g. has a probability of being malicious that exceeds a threshold).

In some implementations, URLs in the email (e.g., hyperlinks within the email or embedded URLS) may be analyzed separately from the header, body, and subject-line data. In some cases, the URLs may be analyzed together with a domain of one or more of a sender's email address, a return-path address, or a reply-to address included in the email header. In some implementations, attack-detection server 140 may navigate to the link (e.g., in a sandbox or virtual machine). The attack-detection server 140 may analyze re-routing from the link, any automatic downloads, or web page data from the navigated to link to help determine the email's legitimacy. In some instances, the attack-detection server 140 may analyze a webpage navigated to by the link (e.g., review the webpage's contents, internal links, and URLs). In some cases, the attack-detection server 140 may resolve an internet protocol (IP) address associated with the link and analyze the IP address as a factor in determining the email's legitimacy. For example, attack-detection server may perform infrastructure analysis by mapping the IP address to addresses of other links seen inside the organization (e.g., where employees have previously navigated). In some cases, the system may review threat feeds and other enrichment sources to better identify whether the hosting server/network of a specific IP address is reputable (e.g., if the host system is not reputable, then the link is more likely not reputable).

As non-limiting examples, features of an email subject line analyzed may include one or more of raw subject line text, word count, digit count, character count, special character count, and bag-of-words (BOW) of subject line text and phrases. In some cases, the attack-detection server 140 may determine whether the subject line conveys a sense of urgency (e.g., includes the word "URGENT" or "IMMEDIATE RESPONSE REQUIRED"), which may by correlated with an email-based attack. As non-limiting examples, features of an email sender information analyzed may include one or more of whether email is sent from a generic company email (e.g., "info@company.com" or "support@company.com"), whether the email has been sent from a known company domain (e.g., previously known or verifiable or used in previous communications with particular users and/or within the organization), and similarity between email sender name and sender email address (e.g., cosine similarity). As non-limiting examples, attributes of an email body analyzed may include any HTML elements (e.g., disregarding tags generated by an email client), raw text with all html elements removed, and count of links (e.g., hyperlinks or URLs) in the email body. As non-limiting examples, features of URL for analysis may include one or more one-hot encoded of the top level domain found in URLs within the body of the email, whether a URL is a shortened or tiny URL, whether the URLs use secure connections (e.g., SSL encryption or HTTPS), a count of subdomains in a URL link, a count of delimited in an URL string, a count of digits in a URL query strength, and a length of a full URL string.

With email analysis, there is often a one-to-many relationship between sets of information. For example, for any given email, there are multiple links and attachments. Accordingly, in the related art, one issue is aggregating up features from a lower level variable number of pieces of information into a global level. For instance, for an email with ten links but only one is identified as malicious, passing this information to the global classifier is not necessarily straightforward (e.g., maximum (any link malicious), minimum (any link valid), or average (email links 90% valid)). To address this issue, each email feature (e.g., links, attachments) may be analyzed to determine what is statistically relevant. Therefore, in some implementations, links may individually and as a group be analyzed in either a neural network or nonparametric decision tree model to analyze the combination of continuous and discreet features of the plurality of links.

In some cases, automated email analysis may include creating common global features using statistical methods (e.g., mean, median, mode, max, min, etc.), which may be used to reduce variable length features to an individual descriptive feature (or predetermined set of features) that can be applied at the email level. Moreover, in some cases, automated email analysis may include automatically selecting a subset of features (from among a plurality of email features) that individually and/or collectively have the strongest correlation with email tags (e.g., benign or malicious).

The machine-learning structures illustrated in FIGS. 2A and 2B may provide surprising benefits such that the accuracy of the machine-learning models is improved beyond the sum of their parts. For example, by segmenting the data, specialized models may be tailored to the specific data segment, while any biases and noise can be averaged out by combining the different models.

Figure 3:
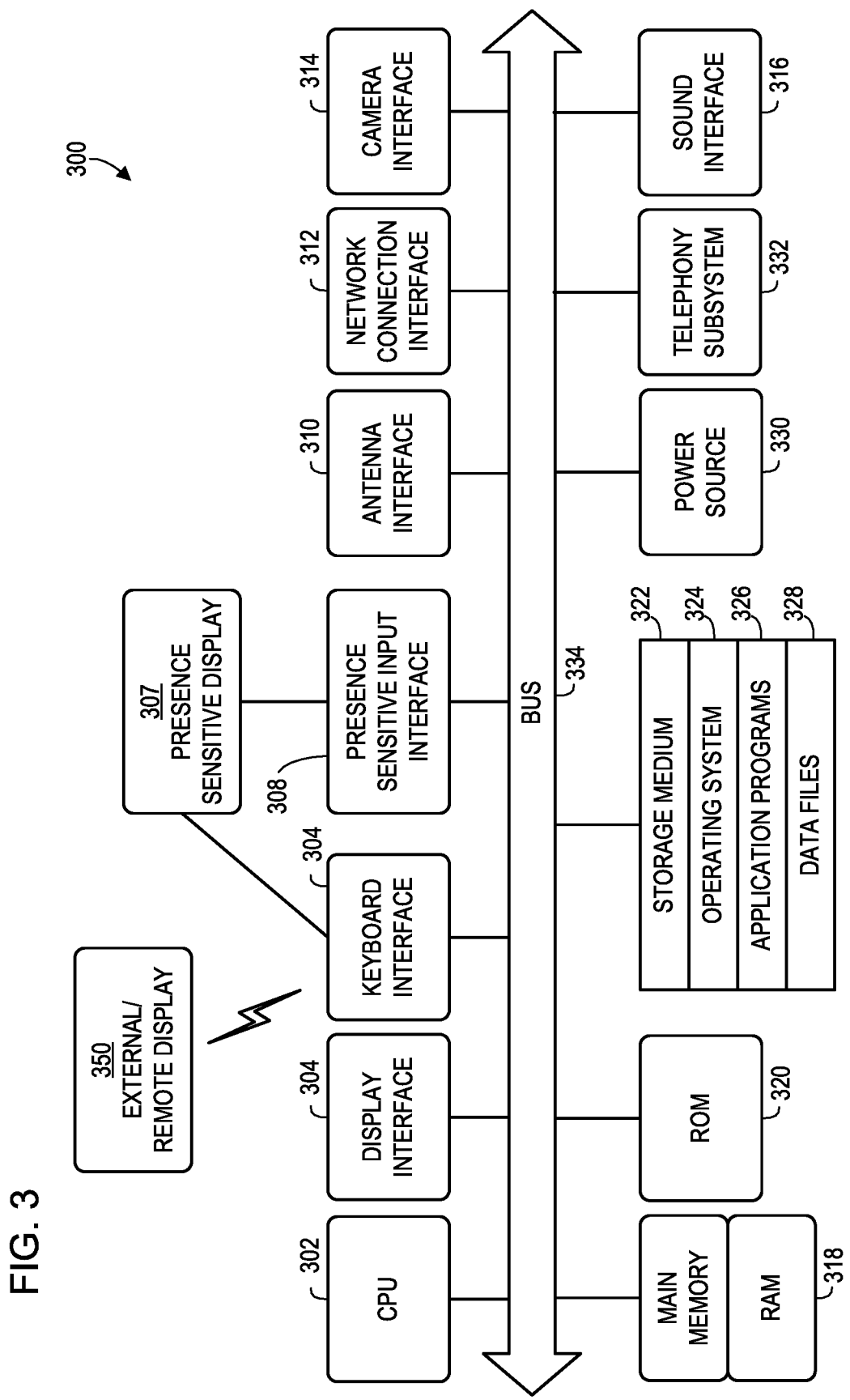
FIG. 3 is a computer architecture block diagram according to an example embodiment.

FIG. 3 is a block diagram of an illustrative device architecture 300, according to an example implementation. As non-limiting examples, email server 110, MTA filter 120, reception device 130a-130c, attack-detection server 140, and analyst device 150 may be implemented using one or more elements from the device architecture 300. It will be understood that the computing device architecture 300 is provided for example purposes only and does not limit the scope of the various implementations of the present disclosed systems, methods, and computer-readable mediums.

The computing device architecture 300 of FIG. 3 includes a central processing unit (CPU) 302, where computer instructions are processed, and a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display 350 that is not necessarily physically connected to the mobile computing device. For example, a desktop monitor may be used for mirroring graphics and other information that is presented on a mobile computing device. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be used for mirroring or extending graphical information that may be presented on a mobile device. In another example, the display interface 304 may wirelessly communicate, for example, via the network connection interface 312 such as a Wi-Fi transceiver to the external/remote display 350.

The computing device architecture 300 may include a keyboard interface 306 that provides a communication interface to a keyboard. In one example implementation, the computing device architecture 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display.

The computing device architecture 300 may be configured to use an input device via one or more of input/output interfaces (for example, the keyboard interface 306, the display interface 304, the presence-sensitive display interface 308, network connection interface 312, camera interface 314, sound interface 316, etc.) to allow a user to capture information into the computing device architecture 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 300 or may be a separate device. For example, the input device may be an accelerometer, a magnetometer, a digital camera, a microphone, and an optical sensor.

Example implementations of the computing device architecture 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored.

According to an example implementation, the computing device architecture 300 includes a power source 330 that provides an appropriate alternating current (AC) or direct current (DC) to power components.

According to an example implementation, the computing device architecture 300 includes a telephony subsystem 332 that allows the device architecture 300 to transmit and receive sound over a telephone network. The constituent devices and the CPU 302 communicate with each other over a bus 334.

According to an example implementation, the CPU 302 has appropriate structure to be a computer processor. In one arrangement, the CPU 302 may include more than one processing unit. The RAM 318 interfaces with the bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 to execute software programs. Data may be stored in the RAM 318, where the data may be accessed by the CPU 302 during execution.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 322, which may include a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases are intended solely for explanatory purposes, without limiting the scope of the disclosed technology.

In some implementations, an organization's email server receives emails directed to a number of employees. Certain filters and/or other processes are used to detect and holdback malicious emails. The remaining emails are then sent to the employees. Employees report any potentially malicious emails to the attack-detection server, which provides near real-time feedback to the employees about the maliciousness of the email. It may repeatedly analyze the email in light of new or additional information (e.g., input from an analyst), and update the employee if the attack-detection server's analysis of the email changes. Certain emails analyzed by the attack-detection server are forwarded to the analyst to check for false positives and false negatives. Feedback from the employees and the analyst cause the machine-learning algorithms of the attack-detection server to adapt.

In some implementations, all emails cleared by the filters and sent to the employees are also sent to the attack-detection server. The attack-detection server may proactively analyze all incoming emails to detect malicious emails before receiving employee input. In some cases, the attack-detection server may be able to remove malicious emails from employee inboxes, limit access to malicious emails (e.g., by deactivating links), or otherwise limit or warn employees about malicious emails.

What is claimed is:

1. A method comprising:
  receiving an email addressed to a user;
  separating the email into a plurality of email components including a first link;
  analyzing, using machine-learning techniques, the first link by:
    virtually navigating to an end-point of the first link;
    receiving any automatic download triggered by virtually navigating to the end-point; and
    analyzing the automatic download;

providing the analyses of the first link to a stacked ensemble analyzer comprising a nonparametric model; and determining, based on an output of the stacked ensemble analyzer, that the email is potentially malicious.

2. The method of claim 1, further comprising:

analyzing, using machine-learning techniques, a remainder of the plurality of email components, wherein the plurality of email components comprises one or more of an email header, an email body, a subject line, or one or more attachments.

3. The method of claim 2, further comprising:

analyzing at least one of the email body or the subject line using term frequency-inverse document frequency (TF-IDF) logistic regression trained with an email corpus.

4. The method of claim 2, further comprising:

analyzing the email header using a random decision forest classifier.

5. The method of claim 2, further comprising:

analyzing the email header by analyzing a path of delivery for the email.

6. The method of claim 1, further comprising:

deactivating the first link in response to determining that the email is potentially malicious.

7. The method of claim 1, further comprising:

comparing a universal resource locator (URL) of the first link with a domain of a sender of the email.

8. The method of claim 1, further comprising:

placing a tag on the email to identify the email for supplemental analysis for maliciousness.

9. The method of claim 8, further comprising:

identifying a quantity of emails with the tag;
determining that the quantity of emails with the tag exceeds a threshold value; and
implementing the supplemental analysis based on the quantity of emails exceeding the threshold value.

10. The method of claim 9, wherein:

the threshold value is based on a tag type; and
the tag type comprises one or more of spear phishing, advanced persistent threat (APT), Business Email Compromise, or Executive Spoof.

11. The method of claim 10, further comprising:

generating one or more network rules to quarantine and/or sanitize malicious emails based on the supplemental analysis.

12. A method comprising:

receiving an email addressed to a user;
separating the email into a plurality of semi-structured or unstructured email components;
analyzing each of the plurality of semi-structured or unstructured email components using different machine-learning techniques based on whether an email component of the plurality of semi-structured or unstructured email components is semi-structured or unstructured;
providing the analysis of each of the plurality of semi-structured or unstructured email components to a stacked ensemble analyzer comprising a nonparametric model;
determining, based on an output of the stacked ensemble analyzer, that the email is potentially malicious;
outputting the email to a computer a computing device;
receiving, from the computing device, an indication that the email is potentially malicious; and
updating the machine-learning techniques, responsive to the indication, by:
updating a training corpus of malicious emails to include the email; and
incrementally retraining the machine-learning techniques based on the training corpus.

13. The method of claim 12, wherein:

the plurality of structured or unstructured email components comprises a first link; and
determining that the email is potentially malicious comprises comparing a universal resource locator (URL) of the first link with a domain of a sender of the email.

14. The method of claim 12, further comprising:

generating ranking data indicating a maliciousness of potentially malicious emails; and
sending the ranking data to the stacked ensemble analyzer.

15. The method of claim 14, wherein the ranking data is based on one or more of likelihood of maliciousness, sophistication of attack, breadth of attack, or potential impact.

16. The method of claim 12, wherein the stack ensemble analyzer further comprises a random-forest classifier.

17. The method of claim 12, wherein the stack ensemble analyser further comprises a gradient boosting machine.

18. The method of claim 12, wherein the computing device is a systems operations console.

19. The method of claim 12, wherein the machine-learning techniques comprises term frequency-inverse document frequency (TF-IDF) logistic regression for unstructured email components of the plurality of semi-structured or unstructured email components and random decision forest classifier for semi-structured email components of the plurality of semi-structured or unstructured email components.

20. The method of claim 12, further comprising:

placing a tag on the email to identify the email for supplemental analysis for maliciousness;
identifying a quantity of emails with the tag;
determining that the quantity of emails with the tag exceeds a threshold value; and
implementing the supplemental analysis based on the quantity of emails exceeding the threshold value,
wherein the threshold value is based on a tag type, and
wherein the tag type comprises one or more of spear phishing, advanced persistent threat (APT), Business Email Compromise, or Executive Spoof.

* * * * *